United States Patent
Williamson III et al.

(10) Patent No.: US 6,325,551 B1
(45) Date of Patent: Dec. 4, 2001

(54) METHOD AND APPARATUS FOR OPTICALLY ALIGNING OPTICAL FIBERS WITH OPTICAL DEVICES

(75) Inventors: Robert S. Williamson III; Robert Marsland, both of Madison, WI (US)

(73) Assignee: New Focus, Inc., San Jose, CA (US)

( * ) Notice: Subject to any disclaimer, the term of this patent is extended or adjusted under 35 U.S.C. 154(b) by 0 days.

(21) Appl. No.: 09/457,756

(22) Filed: Dec. 8, 1999

(51) Int. Cl.$^7$ ....................................................... G02B 6/30
(52) U.S. Cl. ................................ 385/88; 385/90; 385/91; 385/147
(58) Field of Search .................................. 385/88, 90, 91, 385/147

(56) References Cited

U.S. PATENT DOCUMENTS

| | | |
|---|---|---|
| 4,030,811 | 6/1977 | Khoe et al. . |
| 4,119,363 | 10/1978 | Camlibel et al. . |
| 4,130,343 | 12/1978 | Miller et al. . |
| 4,296,998 | 10/1981 | Dufft . |
| 4,346,294 | 8/1982 | Albaugh et al. . |
| 4,399,541 | 8/1983 | Kovats et al. . |
| 4,413,881 | 11/1983 | Kovats . |
| 4,474,657 | 10/1984 | Chaoui et al. . |
| 4,479,698 | 10/1984 | Landis et al. . |
| 4,500,165 | 2/1985 | Scholl et al. . |
| 4,591,711 | 5/1986 | Taumberger . |
| 4,623,220 | 11/1986 | Grabbe et al. . |
| 4,657,346 | 4/1987 | Berry et al. . |
| 4,707,067 | 11/1987 | Haberland et al. . |
| 4,708,431 | 11/1987 | Pikulski et al. . |
| 4,720,163 | 1/1988 | Goodvin et al. . |
| 4,722,586 | 2/1988 | Dodson et al. . |
| 4,726,386 | 2/1988 | Gordon et al. . |
| 4,726,648 | 2/1988 | Haberland et al. . |
| 4,728,787 | 3/1988 | Henry et al. . |
| 4,752,109 | 6/1988 | Gordon et al. . |
| 4,756,590 | 7/1988 | Forrest et al. . |
| 4,776,705 | 10/1988 | Dholakia . |
| 4,779,947 | 10/1988 | Toshiba . |
| 4,802,178 | 1/1989 | Ury . |
| 4,834,490 | 5/1989 | Falkenstein et al. . |
| 4,838,639 | 6/1989 | Morankar et al. . |
| 4,844,581 | 7/1989 | Turner . |
| 4,865,410 | 9/1989 | Estrada et al. . |
| 4,865,417 | 9/1989 | Naohiro et al. . |
| 4,867,524 | 9/1989 | Courtney et al. . |
| 4,897,711 | 1/1990 | Blonder et al. . |
| 4,946,246 | * 8/1990 | Shiga . |
| 4,966,439 | 10/1990 | Althaus et al. . |
| 4,988,159 | 1/1991 | Turner et al. . |
| 5,011,256 | 4/1991 | Johnson et al. . |
| 5,018,820 | 5/1991 | Boudreau et al. . |
| 5,071,215 | 12/1991 | Hockaday . |
| 5,073,002 | 12/1991 | Hockaday . |
| 5,077,819 | 12/1991 | Greil et al. . |

(List continued on next page.)

*Primary Examiner*—Hung N. Ngo
(74) *Attorney, Agent, or Firm*—Conley, Rose & Tayon, PC; B. Noël Kivlin (57) ABSTRACT

An automatic fiber pigtailing machine (AFPM) is disclosed. The AFPM provides precise coupling between a fiber pigtail and an optoelectronic (OE) device based on the fidelity of signal transfer across a junction between the fiber and OE device. The AFPM uses a positioning system with a high frequency closed loop optical feedback of a modulated signal to/from the device under assembly (DUA). Local/global maximums in the fidelity of the modulated signal are correlated with relative orientations/alignment/positions of the various components of the DUA to determine the preferred orientation/alignment/positions between the various components for the completed assembly. In an embodiment of the invention the fiber optic extends from a first surface of a generally rectangular package and the electrical interface to the OE device is defined on a surface orthogonal to the first surface. This geometry is compatible with usage on PC boards where side mounting reduces the overall form factor for the PC board since the fiber optic is parallel with the plane of the board.

18 Claims, 10 Drawing Sheets

U.S. PATENT DOCUMENTS

| | | |
|---|---|---|
| 5,113,466 | 5/1992 | Acarlar et al. . |
| 5,127,073 | 6/1992 | Mulholland et al. . |
| 5,127,906 | 7/1992 | Abbott et al. ............... 437/8 |
| 5,146,526 | 9/1992 | Sweeney et al. . |
| 5,155,786 | 10/1992 | Ecker et al. . |
| 5,175,410 | 12/1992 | Freedman et al. . |
| 5,177,806 | 1/1993 | Abbott et al. . |
| 5,217,906 * | 6/1993 | Abbott et al. . |
| 5,218,223 | 6/1993 | Spaeth et al. . |
| 5,221,860 | 6/1993 | Dietrich et al. . |
| 5,241,614 | 8/1993 | Ecker et al. . |
| 5,276,754 | 1/1994 | Blair et al. . |
| 5,295,700 | 3/1994 | Crews et al. . |
| 5,361,317 | 11/1994 | Hartman et al. . |
| 5,390,271 | 2/1995 | Priest . |
| 5,452,389 | 9/1995 | Tonai et al. . |
| 5,467,419 | 11/1995 | Roff et al. . |
| 5,509,952 | 4/1996 | Moore et al. . |
| 5,550,088 | 8/1996 | Dautartas et al. . |
| 5,557,212 | 9/1996 | Isaac et al. . |
| 5,611,014 | 3/1997 | Basavanhally . |
| 5,631,987 | 5/1997 | Laksy et al. . |
| 5,658,364 | 8/1997 | DeVore et al. . |
| 5,689,608 | 11/1997 | Moore et al. . |
| 5,692,084 | 11/1997 | Roff . |
| 5,729,147 | 3/1998 | Schaff . |
| 5,745,311 | 4/1998 | Fukuoka et al. . |
| 5,764,832 | 6/1998 | Tabuchi . |
| 5,764,836 | 6/1998 | Roff . |
| 5,793,915 | 8/1998 | Joyce . |
| 5,802,228 | 9/1998 | Bock et al. . |
| 5,815,623 | 9/1998 | Gilliland et al. . |
| 5,841,924 | 11/1998 | Mugiya et al. . |
| 5,854,869 | 12/1998 | Joyce . |
| 5,857,047 | 1/1999 | Strand et al. . |
| 5,875,275 | 2/1999 | Evans et al. . |
| 5,881,189 | 3/1999 | Carberry et al. . |
| 5,911,021 | 6/1999 | MacDonald et al. . |
| 5,916,458 | 6/1999 | Komoriya et al. . |
| 5,930,276 | 7/1999 | Dou et al. . |
| 5,963,695 | 10/1999 | Joyce . |
| 5,971,628 | 10/1999 | Dona et al. . |
| 5,977,567 | 11/1999 | Verdiell . |
| 6,071,017 | 6/2000 | Gilliland et al. . |
| 6,081,637 | 6/2000 | Rekow . |
| 6,081,638 | 6/2000 | Zhou . |
| 6,106,161 | 8/2000 | Basavanhally et al. . |
| 6,122,430 | 9/2000 | Bookbinder et al. . |
| 6,140,698 | 10/2000 | Damphousse et al. . |
| 6,164,837 * | 12/2000 | Haake et al. . |

* cited by examiner

METHOD AND APPARATUS FOR OPTICALLY ALIGNING OPTICAL FIBERS WITH OPTICAL DEVICES

This invention was made with Government support under Contract F30602-97-C-0144 awarded by the Air Force. The Governnent has certain rights in this invention.

BACKGROUND OF THE INVENTION

COPYRIGHT AUTHORIZATION

A portion of the disclosure of this patent document contains material which is subject to copyright protection. The copyright owner has no objection to the facsimile reproduction by any one of the patent disclosure, as it appears in the U.S. Patent and Trademark Office patent files or records, but otherwise reserves all copyright rights whatsoever.

1. Field of Invention

This invention relates to coupling apparatus designed to align and join together the component parts of an optoelectronic package or module.

2. Description of the Related Art

The new technologies of high-speed communications utilize optoelectronic (OE) devices. Currently, the telecommunications network serving the United States and the rest of the world is evolving from analog to digital transmission with ever increasing bandwidth requirements. Increased bandwidth is realized by replacing copper cable on large trunks and subscriber distribution plants with fiber optic cable. Fiber optic cable is capable of carrying much more information than copper and with lower attenuation.

All the OE devices on the receive and transmit sides must be fabricated with a high degree of accuracy, and in large numbers. Assembly of the fiber optic filament to the devices requires that the device and fiber be coupled mechanically and optically. Typically this involves sub-micrometer accuracy, performed manually by skilled technicians working with microscopes and high-precision manipulators. Once each OE device is assembled it must be tested electrically to verify its performance. Then the device is typically assembled onto a printed circuit board for connection to other electronic and optical signal processing components.

What is needed is high-speed, low-cost, high-precision equipment for the manufacture of OE devices.

SUMMARY OF THE INVENTION

An automatic fiber pigtailing machine (AFPM) is disclosed. The AFPM provides precise coupling between a fiber pigtail and an optoelectronic (OE) device based on the fidelity of signal transfer across a junction between the fiber and OE device. The AFPM uses a positioning system with a high frequency closed loop optical feedback of a modulated signal to/from the device under assembly (DUA). Local/global maximums in the fidelity of the modulated signal are correlated with relative orientations/aligmnent/positions of the various components of the DUA to determine the preferred orientation/alignment/positions between the various components for the completed assembly. In an embodiment of the invention the fiber optic extends from a first surface of a generally rectangular package; and the electrical interface to the OE device is defined on a surface orthogonal to the first surface. This geometry is compatible with usage on PC boards where side mounting reduces the overall form factor for the PC board since the fiber optic is parallel with the plane of the board.

In an embodiment of the invention an apparatus for coupling an optical fiber with an optical device is disclosed. The apparatus includes: a modulator, a demodulator, an evaluator and at least one moveable stage. The modulator couples to one of the optical fiber and the optical device to transmit a modulated signal including data. The demodulator couples to the other of the optical fiber and the optical device to receive the modulated signal and demodulate the data. The evaluator couples to the modulator and demodulator. The evaluator evaluates the fidelity of the data received and transmitted at a plurality of positions of the optical fiber and the optical device and selects preferred positions for the optical fiber and the optical device based on the fidelity of the data transfer. The at least one movable stage is responsive to a selection of the preferred positions by the evaluator to position at least one of the optical fiber and the optical device at the preferred positions.

In another embodiment of the invention an apparatus for coupling an optical fiber and ferrule with an optical device is disclosed. The optical device is contained within an interior portion of a package. The package includes on an exterior portion thereof a first electrical interface to the optical device. The apparatus for coupling includes: an x-stage, a y-stage, a z-stage, a test fixture and at least one welder. The x-, y- and z-stages couple to at least one of the optical fiber with a ferrule and the package and position the optical fiber with respect to the optical device. The test fixture includes a second electrical interface for removably forming a high frequency electrical coupling with the first electrical interface to transmit or receive a high frequency signal to or from the optical device. The at least one welder is responsive to a positioning of the optical fiber and the optical device at preferred positions to affix the optical fiber with the optical device.

In an alternate embodiment of the invention an apparatus for coupling an optical fiber and optical device is disclosed. The apparatus includes: means for modulating, means for demodulating, means for evaluating, and means for positioning. The means for modulating modulates data onto one of the optical fiber and the optical device. The means for demodulating demodulates the data at the other of the optical fiber and the optical device. The means for evaluating evaluates the fidelity between modulated and demodulated data at a plurality of positions of the optical fiber and the optical device and selects preferred positions for the optical fiber and the optical device based on the fidelity. The means for positioning positions at least one of the optical fiber and the optical device at the preferred positions responsive to a selection of the preferred positions by said means for evaluating.

In still another embodiment of the invention, an apparatus for coupling an optical fiber with a ferrule at an end thereof with an optical device contained within an interior portion of a package is disclosed. The package includes an exterior portion with a first electrical interface to the optical device. The apparatus for coupling includes: a means for removably forming a high-frequency electrical coupling, a means for positioning, and a means for fastening. The means for removably forming forms a high-frequency electrical coupling with the first electrical interface to transmit and receive a high frequency signal from the optical device. The means for positioning positions the optical fiber and the optical device at preferred positions. The means for means for fastening fastens the optical fiber with the optical device.

In still another embodiment of the invention, a method for assembling an optic fiber to an optoelectronic device within an interior portion of a package is disclosed. The method for assembling comprises the acts of:

evaluating a fidelity of data transfer across the junction of the fiber and optoelectronic device at a plurality of positions of the optical fiber and the optical device to determine a preferred position for the fiber and the optoelectronic device; and fastening the fiber to the package at the preferred position.

BRIEF DESCRIPTION OF THE DRAWINGS

These and other features and advantages of the present invention will become more apparent to those skilled in the art from the following detailed description in conjunction with the appended drawings in which:

FIGS. 7 A–B are front isometric views of OE device oriented with respect to the test bed portion of the rotary stage shown in FIGS. 3–5.

FIG. 7C is an isometric bottom view of the assembled OE device including package and fiber pigtail.

DETAILED DESCRIPTION OF THE EMBODIMENTS

An automatic fiber pigtailing machine (AFPM) is disclosed which allows precise coupling between a fiber pigtail and an optoelectronic (OE) device using a positioning system with a high frequency closed loop optical feedback of a modulated signal to/from the device under assembly (DUA). Local/global maximums in the fidelity of the modulated signal are correlated with relative orientations/alignment/positions of the various components of the DUA to determine the preferred orientation/alignment/positions between the various components for the completed assembly. Additionally, the geometry of the OE assembly with the optic fiber orthogonal to the PC board connections of the OE package allows OE assemblies to be included on PC boards while maintaining a compact form factor.

Figure 1:
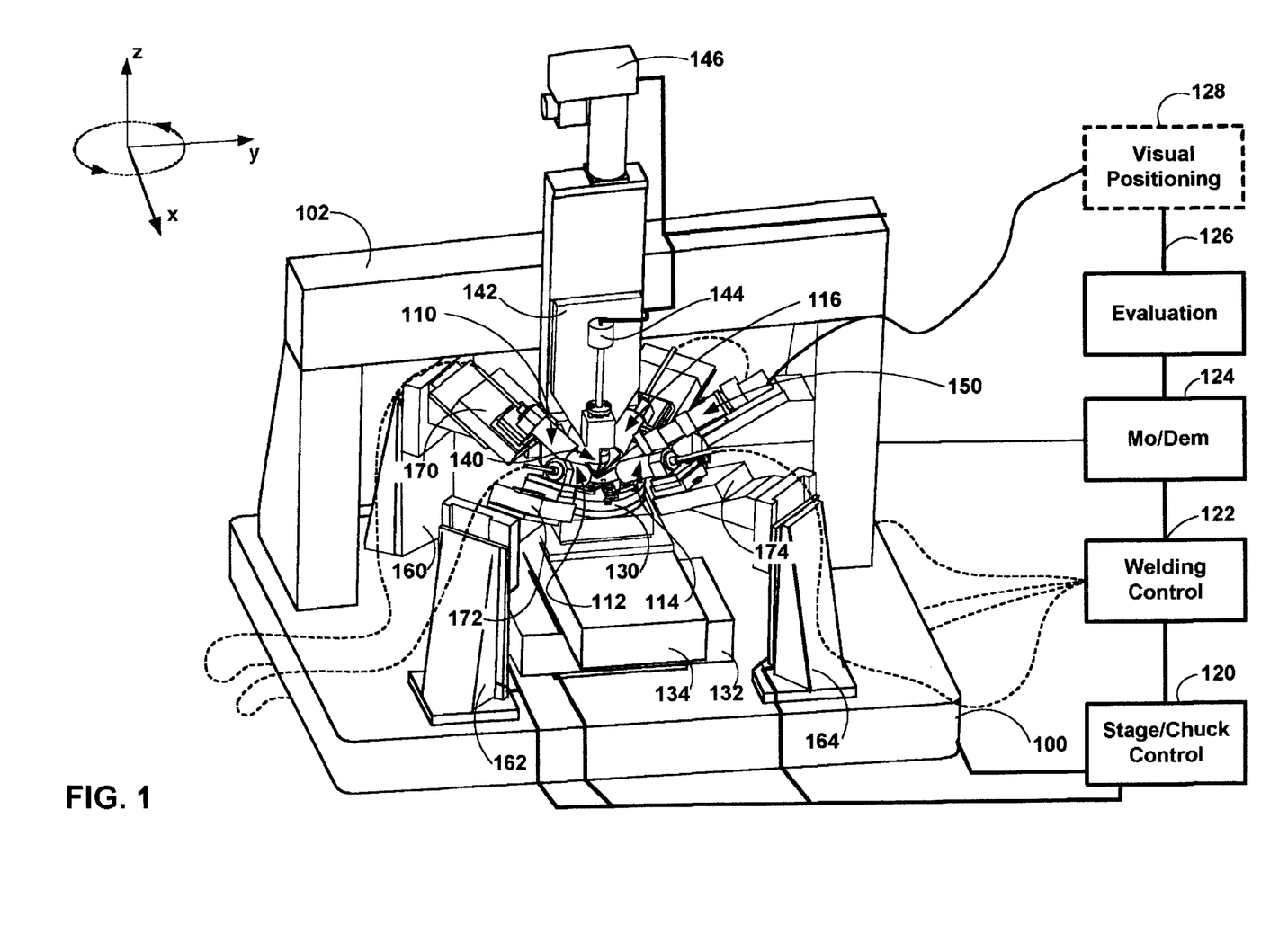
FIG. 1 is an isometric view of an automated fiber pigtailing machine (AFPM) which provides automatic optical fiber alignment and mechanical assembly between a fiber optic filament and an optoelectronic (OE)device.

FIG. 1 is an isometric view of an automated fiber pigtailing machine (AFPM) which provides automatic optical fiber alignment and mechanical assembly between a fiber optic filament and an optoelectronic device (OE). The AFPM includes a frame with a lower portion 100 and an upper portion 102. Four welders with welding heads 110–116 are positioned radially with respect to one another at intervals of about 90°. The locus of the heads is the junction of an OE package and a fiber optic pigtail (See FIGS. 3–7). In an embodiment of the invention the welding heads are Nd:YAG lasers. Each laser welding head is coupled via a corresponding radial and a z-axis linear motion stage to the base 100. Welding head 110 is coupled via radial stage 170 and z-axis stage 160 to the base 100. Welding head 112 is coupled via radial stage 172 and z-axis stage 162 to the base 100. Welding head 114 is coupled via radial stage 174 and z-axis stage 164 to the base 100. The welding head 116 is similarly coupled to the base via its associated radial and z-axis stages (not shown). The welding heads are positionable radially via the radial stages and linearly along the z-axis via the z-axis stages. In an embodiment of the invention, the radial stages 160–164 may also be able to translate linearly within a plane parallel to the x-y plane. An imaging device 150 is coupled to the base and has is as its focal point the junction between the OE package and the fiber optic pigtail. A fiber optic chuck 140 is also positioned at the locus of the welding heads and OE package. The fiber optic chuck 140 holds the fiber optic pigtail while the fixtures on the rotary stage 130 clamp the OE package.

The OE package is held in electrical contact with a test bed portion of the rotary stage 130. The rotary stage 130 is coupled to the base via both an x- and a y-axis translation stage, respectively 132–134. The chuck assembly is mounted to the upper portion 102 of the frame. The fiber optic chuck 140 may be positioned along the z-axis via actuator 146 which translates mounting plate 142 along the z-axis. The chuck and associated clamping actuator are coupled to the mounting plate and thus experience translation along the z-axis as well. The chuck may be moved between a clamping and a released position via actuator 144.

In a fully automated embodiment of the invention, modules 120–128 handle the automation of the various parts of the AFPM. The stage/chuck control 120 is coupled to the actuators for each of the stages. That module generates commands required to move one or more of the various stages of the machine as well as the chuck to the required position. That module also handles the clamping and unclamping of the chuck. The welding control 122 is coupled to the welding heads 110–116, and handles the application of power to one or more of those heads to mechanically couple the fiber optic, lid and package of the OE assembly.

Figures 7A, 7B, 7C:
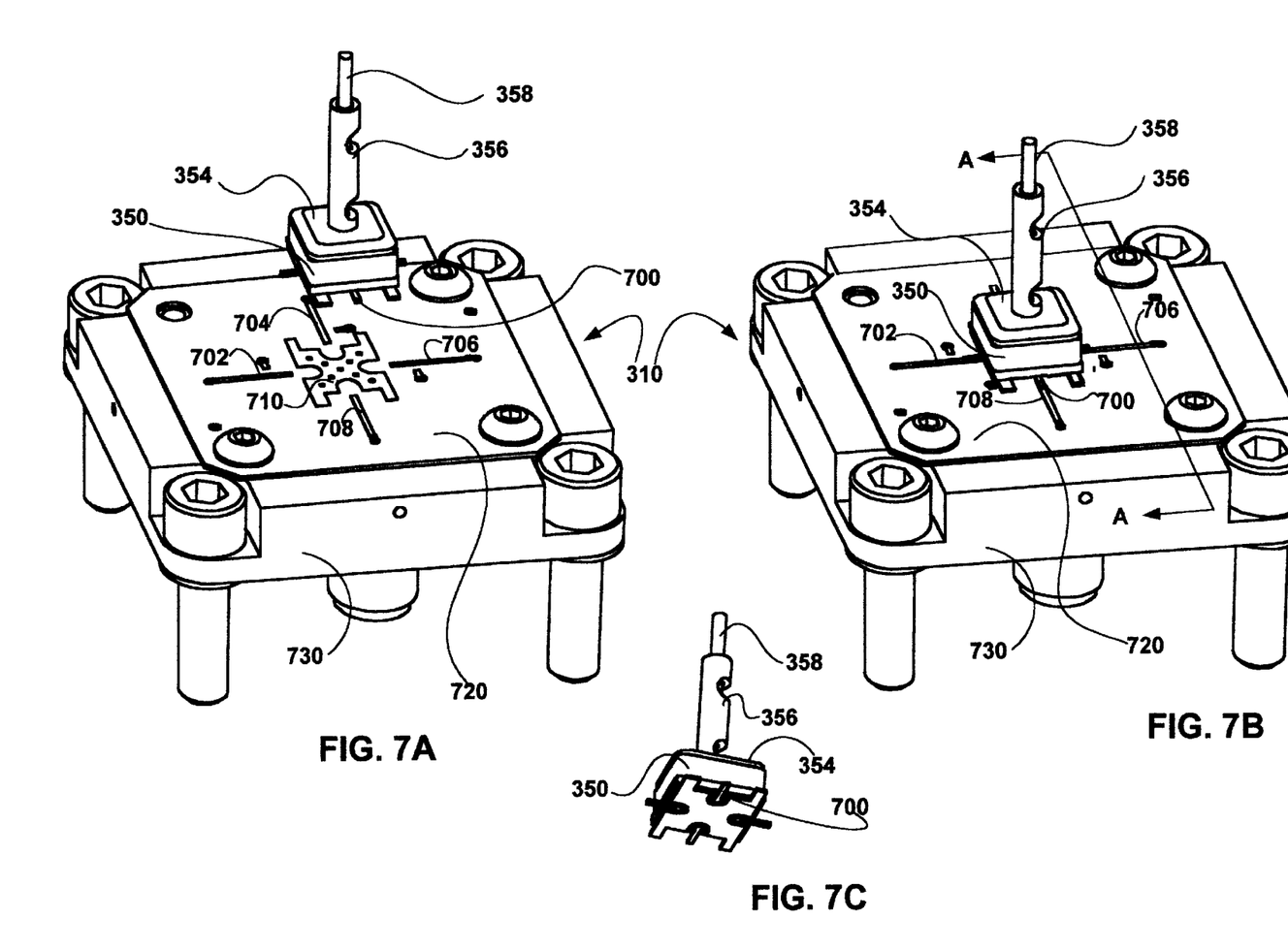

The Modulation and Demodulation (Mo/Dem) module 124 is coupled both to the fiber optic pigtail (not shown) as well as to the test bed (See FIGS. 7A–B). The test bed is part of the rotary stage to which the package is electrically coupled during assembly of the device. The test bed has surface mount features similar to those of the PC boards on which the assembled OE assembly will eventually be placed. The Mo/Dem handles both the sending and receiving of information across the fiber optic and OE coupling. Information may be sent at a number of bit/signal rates, using any of a number of signal modulations. Communications may be conducted at one or more wavelengths and/or power levels. Where the OE is a laser, the Mo/Dem module handles the delivery of modulated signals to the OE device through a coupling made with that device via the test bed. On the receive side an optical detector and Mo/Dem demodulate the signals. Modulation may be analog, digital, or combinations thereof. Analog modulation includes, but is not limited to: On-Off keying (OOK), amplitude (AM), phase (PM), and frequency (FM). Digital modulation includes, but is not limited to: pulse width modulation (PWM), pulse position modulation (PPM), pulse amplitude modulation (PAM), and pulse code modulation (PCM). The information transmitted may range from a simple binary sequence to a complex symbol set and handshake, such as that conducted in a telecommunications environment.

Where the OE is a photodiode, the Mo/Dem module handles the delivery through an external laser (not shown) of a modulated signal to the pigtail, and the receipt and demodulation of the signal through the electrical coupling of the device with the test bed.

The evaluation module 126 evaluates the fidelity between the information transmitted and received by the Mo/Dem 124. Fidelity may be expressed in terms of numerous figures of merit, including but not limited to: bit error rate (BER) and inter-symbol interference (ISI). The evaluation module evaluates the fidelity of the information transmitted and received and determines at which orientations/alignments/positions, either relative or absolute, the optic fiber and OE device couple in such a way as to exhibit a local or global optimum in the fidelity of the modulated signals passed between them. When such an alignment is determined, the welding of the OE package, lid, and ferrule is initiated with the passing of orientation/alignment/position information from the evaluation module 126 to the stage/chuck control 120. The orientation/alignment/position information includes either absolute or relative position and/or orientation information for one or more of the package, lid, ferrule and fiber. The stage/chuck control then positions the package/lid and fiber accordingly.

In an automated embodiment of the invention, the imaging device 150 is coupled to the visual positioning module 126 for the initial positioning of the fiber optic with respect to the OE device.

Modules 120–128 may be implemented in hardware, software or firmware. In an alternate embodiment of the invention the x-y-z stages are combined and are coupled to either the fiber 358 and ferrule 356 or the test fixture 310. Numerous other variations on the arrangement of the stages and their linkage with one or the other of the fiber/ferrule or the test fixture are possible without departing from the scope of the claimed invention.

Figure 2:
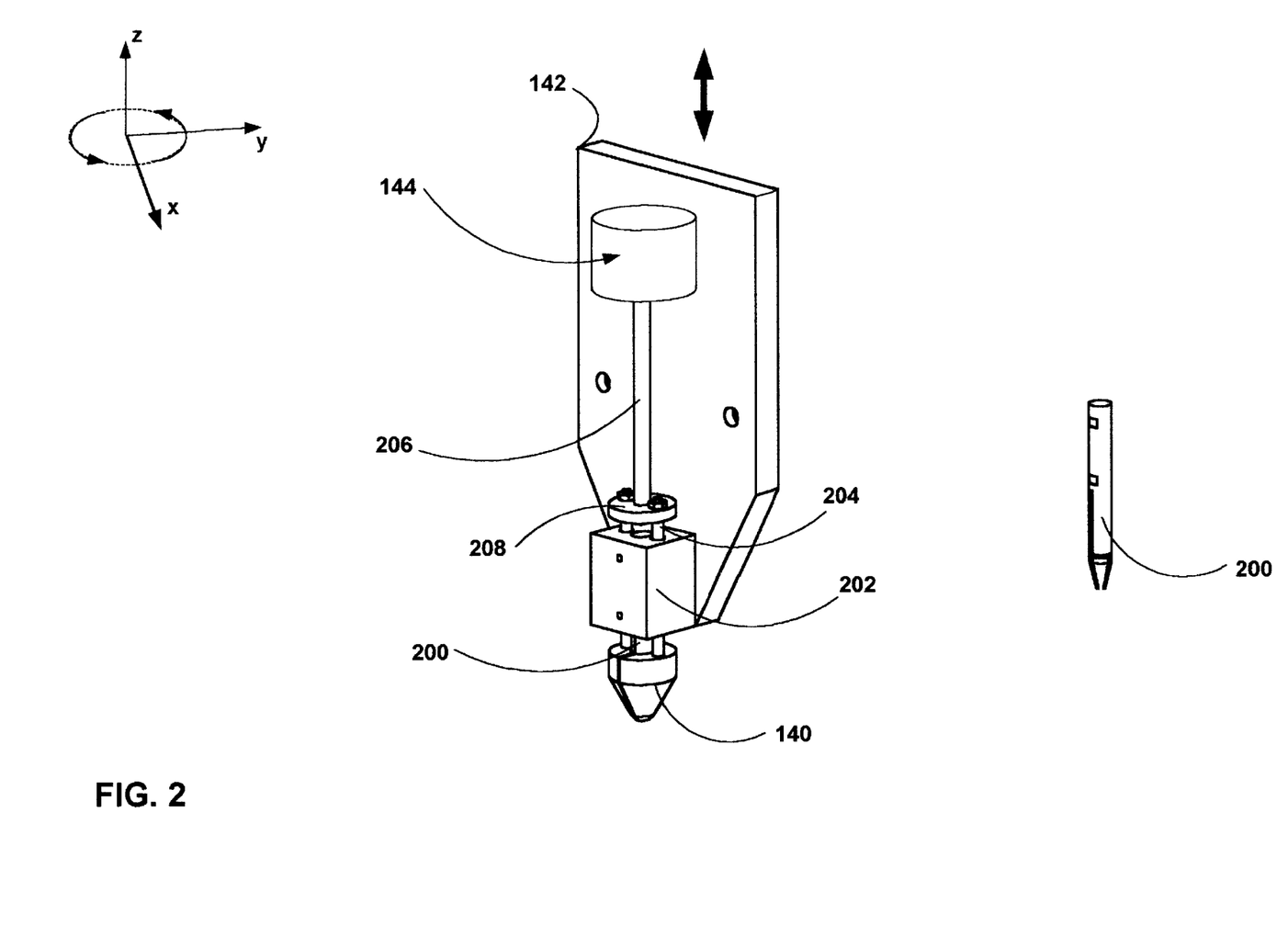
FIG. 2 is an isometric side view of the fiber optic holder portion of the AFPM shown in FIG. 1.

FIG. 2 is an isometric side view of the fiber optic chuck assembly of the AFPM shown in FIG. 1. The collet 200, collet mount 202, chuck 140, draw plate 208, dowels 204, draw rod 206, and actuator 144 are shown mounted on the mounting plate 142 of the z-axis stage. The z-axis stage, as discussed above, translates the entire chuck assembly in FIG. 2 along the z-axis via linear stage actuator 146 (See FIG. 1). The collet 200 is drilled and slotted to produce four springy fingers; the ferrule is inserted into the bottom of 200. The collet 200 is affixed permanently to mounting plate 142 via collet mount 202. Chuck 140 is mounted concentrically over collet 200 and has a conical inner surface matching the outer cone of 200. Actuator 144 pulls draw rod 206, draw plate 208, dowels 204, and chuck 140, all of which comprise one solid assembly up in the +z direction. This action pulls 140 into intimate contact with 200, whose fingers are compressed to firmly hold the ferrule. The chuck 140 has a slot to accommodate the length of fiber pigtail extending from the ferrule. As will be evident to those skilled in the art, the chuck may be implemented in various other mechanical configurations without departing from the scope of the claims.

Figure 3:
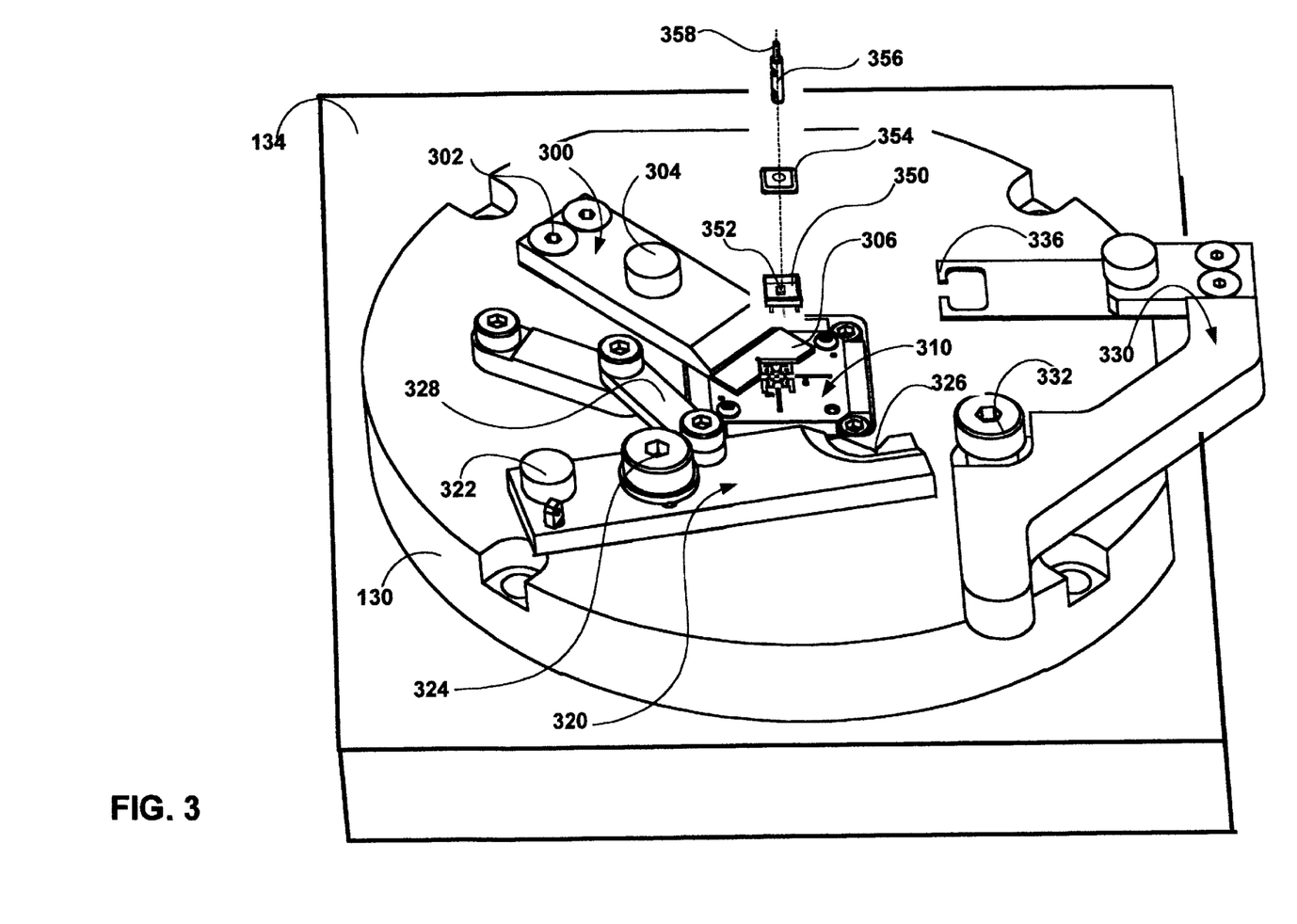
FIGS. 3–5 are detailed isometric views of the rotary stage and clamping fixture portion of the AFPM shown in FIG. 1.
Figure 4:
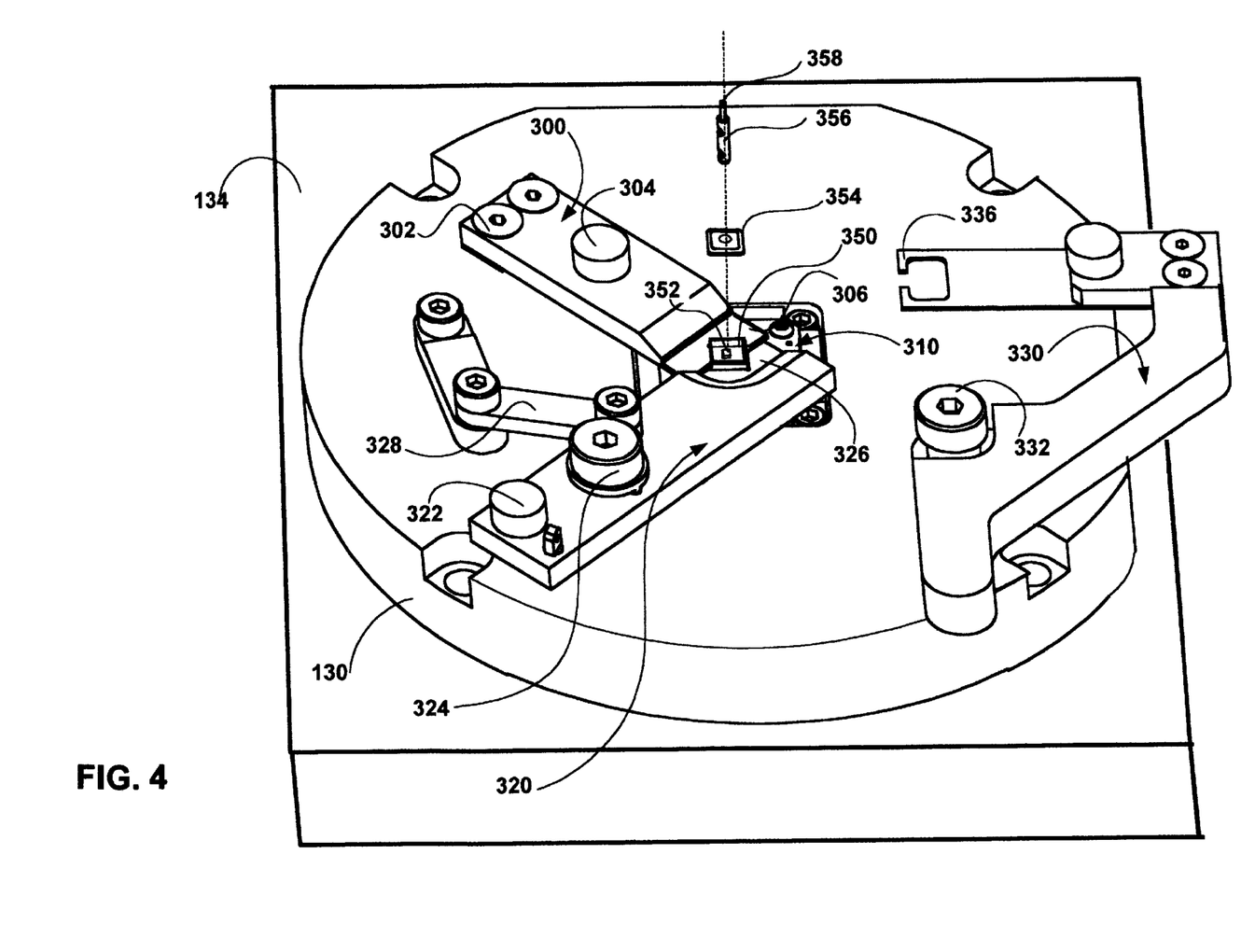
Figure 5:
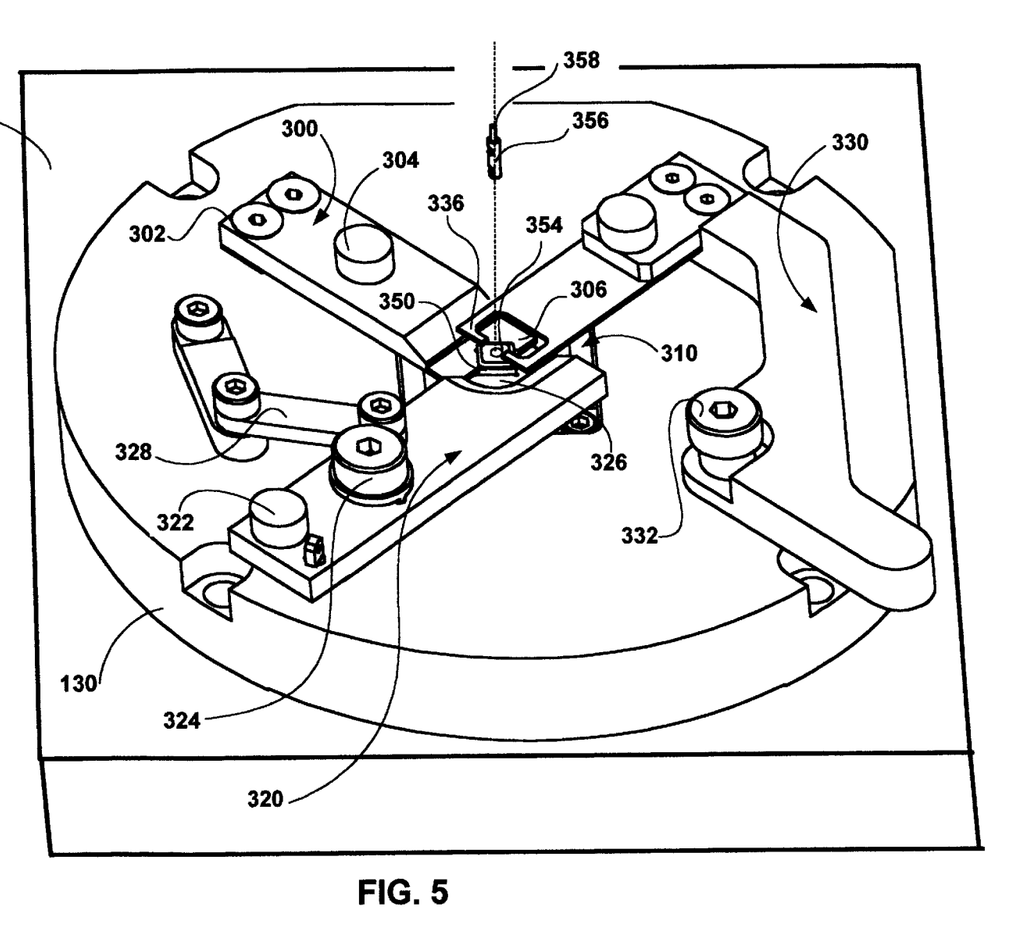

FIGS. 3–5 are detailed isometric views of the rotary stage and clamping fixture portion of the AFPM shown in FIG. 1 at various stages of the clamping operation for the assembly of the OE assembly. The OE assembly is shown in exploded views in each of the figures. That assembly includes: OE device 352, package base 350, lid 354, and the combined ferrule 356 and fiber optic 358.

FIG. 3 shows a first of the stages of the clamping operation. The rotary stage 138 is shown mounted to an intermediate portion of the y-axis stage 134. A test fixture 310 is positioned in an opening in the center of the rotary stage. The fixture is designed to allow a high frequency (e.g., radio frequency (RF) or Microwave) modulated signal to be received from or transmitted to the optical device 352 during assembly. This modulated signal is used by the evaluation module 126 to align the fiber and optical device (See FIG. 1). This results in OE packages which perform with uniform reliability and at the upper end of the theoretical coupling efficiency between fiber and OE device. This represents an improvement over prior art devices which align fiber and OE device so as to maximize the power transmitted through the coupling. Power is only one indicator of coupling efficiency, and does not necessarily correlate with the integrity and rate at which communications can be passed through the coupling. The current invention provides method and apparatus for performing alignment, based on the rate and integrity at which communications can be conducted over the coupling.

Three clamping arms 300, 320, and 330 are shown on upper surface of the rotary stage 130. A pair of the arms 300,320 clamp the package 354 for the optical device 352. Arm 330 holds the lid 354 in frictional engagement with the upper rim of the package 350. The first of the two arms for clamping the package (i.e., arm 300) is pivotally affixed to the rotary stage at a proximal end 302. The arm is moved vertically toward or away from the upper surface of the translation stage via actuator 304. In a manual embodiment of the invention, actuator 304 is a thumbscrew threadably engaging the arm 300 and pressing against the upper surface of the rotary stage. In an automated embodiment of the invention, the actuator 304 may include a solenoid coupled to the stage/chuck control 120 (See FIG. 1). At a distal end, arm 300 defines a profile which complements that of the outer portion of the package. For package 350, which is rectangular in shape, the profile is a "V" shaped slot. The "V" shaped slot is positioned over the electrical contacts on the test fixture 310 for electrically coupling the package and OE device with the test fixture and associated Mo/Dem 124 (See FIG. 1). The "V" shaped slot on arm 300 is designed to engage either a feature on the exterior of the package or contact pins protruding from the package. As the arm is pressed downward, the electrical contacts on the package are brought into contact with the electrical contacts on the test fixture. The electrical contacts are designed to permit a high frequency modulated signal to be coupled to the package.

The next phase of the clamping operation is shown in FIG. 4. With arm 300 clamping the package on 2 sides to the test fixture 310, a second arm 320 is used to clamp the opposing sides of the package to the test fixture. The second arm 320 is pivotally coupled at a proximal end to the rotary stage. At a distal end, a "V" shaped slot is defined which engages and aligns the package with the test fixture. Arm 320 is moved arcuately into engagement with package 350 by means of a second arm 328. Arm 320 is moved vertically downward to press the electrical contacts on the package into engagement with the test bed via an actuator 322. In the embodiment shown, that actuator is a thumbscrew which threadably engages with the arm and moves it toward or away from the upper surface of the rotary stage. In an automated embodiment of the invention, the actuator 322 may include a solenoid coupled to the stage/chuck control 120 (See FIG. 1). In alternate embodiments of the invention, the package may be brought into alignment and contact with the electrical contacts on the test fixture by other clamping and alignment means, including but not limited to: a single arm, a mechanical chuck, a vacuum chuck, etc.

FIG. 5 shows the lid 354 clamped to the rim of the package via arm 330. Arm 330 is pivotally affixed to the rotary stage and is moved arcuately and vertically about fastener 332 at the proximal end of the arm. At the distal end of the arm, a "C" shaped opening with opposing finger clamps opposing corners of the lid to the rim of the package. By clamping on the corners of the lid, the sides of the lid are exposed to the welding heads 110–116 (See FIG. 1), thereby facilitating welding.

Figure 6:
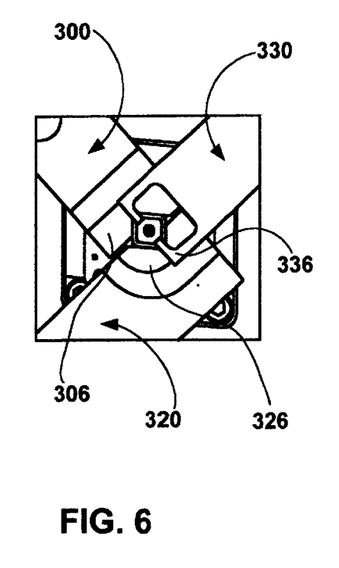
FIG. 6 is a top layout view of the clamping fixtures shown in FIG. 5.

FIG. 6 is a top layout view of the clamping fixtures shown in FIG. 5. Arms 300 and 320 are shown clamping the package 350 between opposing "V" shaped end portions 306, 326 respectively. Arm 330 is shown clamping the corners of the lid to the package.

FIGS. 7 A–B are front isometric views of an OE device oriented with respect to the test bed portion of the rotary stage shown in FIGS. 3–5. The upper surface of the test bed includes a printed circuit board 720 which is mounted to a base 730. A plurality of electrical contacts 702–708 are defined radially at 90° intervals about a contact pad 710 on the upper surface of the printed circuit board. In the testing position shown in FIG. 7B, the electrical connections, e.g., contact pin 700 on package 350 make contact with the corresponding electrical contact, e.g., contact 708 on the printed circuit board. The printed circuit board and the contact layout are designed to minimize capacitive and inductive coupling of signals transmitted/received between the test fixture and package (See FIG. 9).

FIG. 7C is an isometric bottom view of the assembled OE device including package and fiber pigtail. The package 350, lid 352, ferrule 356 and fiber 358 are shown in the assembled position. On the lower surface of the package a plurality of electrical contacts are shown (e.g., contact 700). As discussed above, these contacts allow a signal to be input or received from the OE assembly during the test and alignment phase as well as actual use.

Figure 8A:
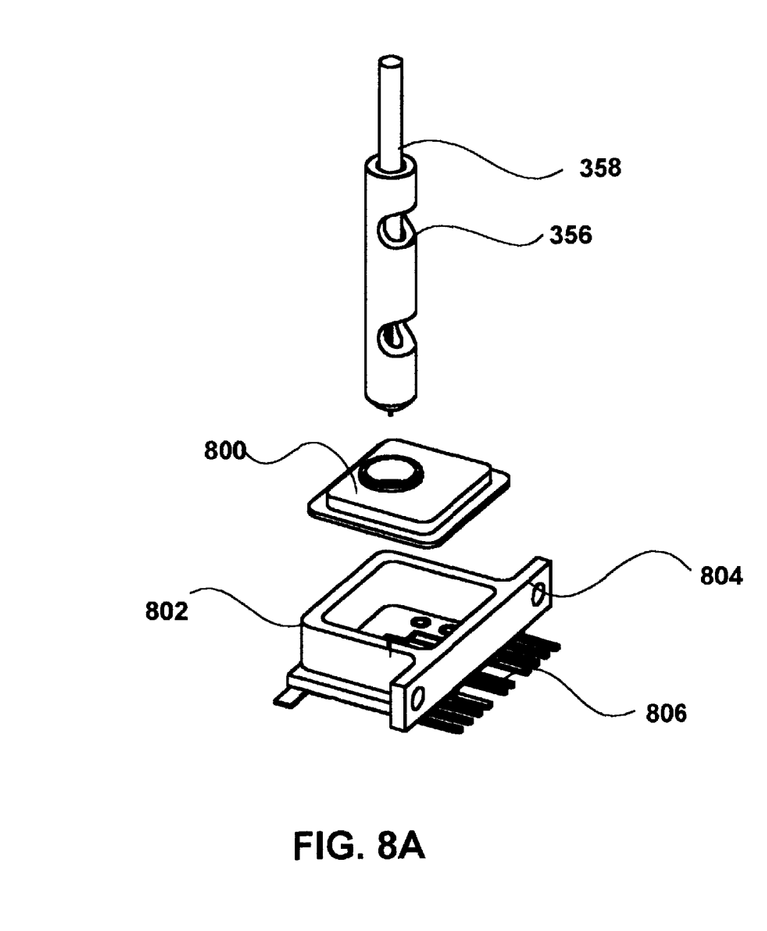
FIGS. 8A–B are exploded and assembled isometric views of an alternate OE package design.
Figure 8B:
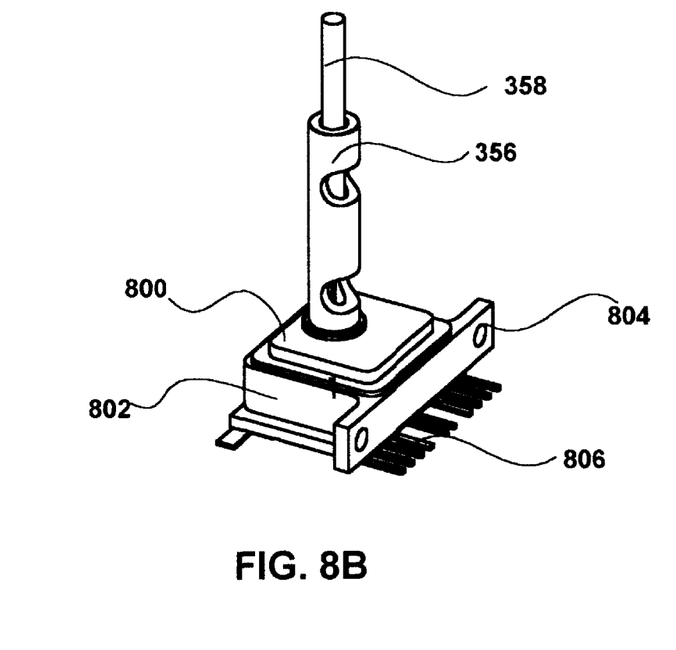

FIGS. 8A–B are exploded and assembled isometric views of an alternate OE package design. In addition to the fiber 358 and ferrule 356, the lid 800 and package 802 are shown. In contrast to the design shown in the prior figures, this package can, in actual use, be side mounted to a PC board with the fiber 358, thereby aligned horizontally with the PC board. A horizontal fiber alignment is desirable because it reduces the form factor of the assembly and because the upper surface of the package protects the fiber/lid interface from impact. The side mounting is enabled by a mounting surface and fastening holes defined on side 804. The contact pins 806 which extend from the same side of the package as the mounting surface 804 interface with a corresponding interface on the PC board.

While the OE package has been described in particular configurations with an optical source in the package and an optical receiving element at the other end of the fiber, it will be appreciated that the positions of the sources and receiving elements could be reversed. Also, while a particular package arrangement has been shown for purposes of illustration, it will be appreciated that the system and present invention could be utilized for assembling other types of OE and other package arrangements, without departing from the scope of the claimed invention. Also, various types of welds or weld materials could be provided.

Figures 9A, 9B:
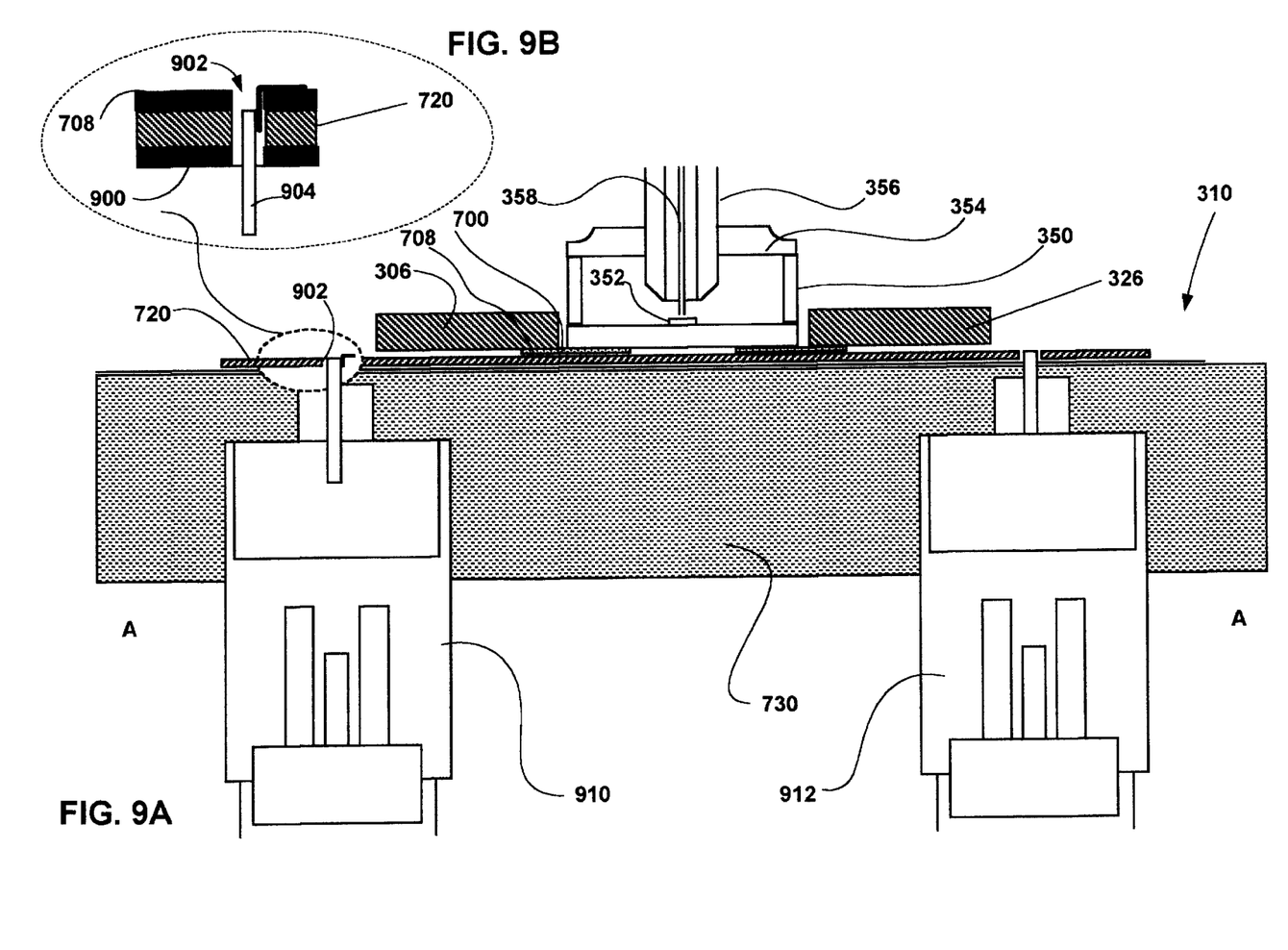
FIGS. 9A–B are detailed cross-sectional views of the test bed and OE device shown in FIG. 7B.

FIGS. 9A–B are detailed cross-sectional views of the test bed and OE device shown in FIG. 7B. The circuit board 720 is bolted to a gold plated stainless steel base 730. The contact pins on the package (e.g., pin 700) make electrical contact with the conductive traces on the upper surface of the circuit board circuit board traces, e.g., trace 708. There is also a conductive trace 900 on the lower surface of the circuit board which serves a ground plane when connected to an electrical ground. This ground plane limits the impedance of the electrical contact between the package and the connectors 910–912 to approximately 50 ohms. Thus, high frequency modulated signals can be delivered to or received from the OE device within the package during the positioning and alignment of the fiber with the OE device. In an embodiment of the invention all traces, e.g., upper and lower on the circuit board 720 are gold-plated to ensure good contact to the package and pins. Ground contact to the package backside is made through the circuit board 720 using plated-through vias to the baseplate 730 which defines electrical ground. Each of the circuit board traces are coupled through the vias to a gold-plated BeCu pin 904, which is part of connector 910–912.

Figure 10:
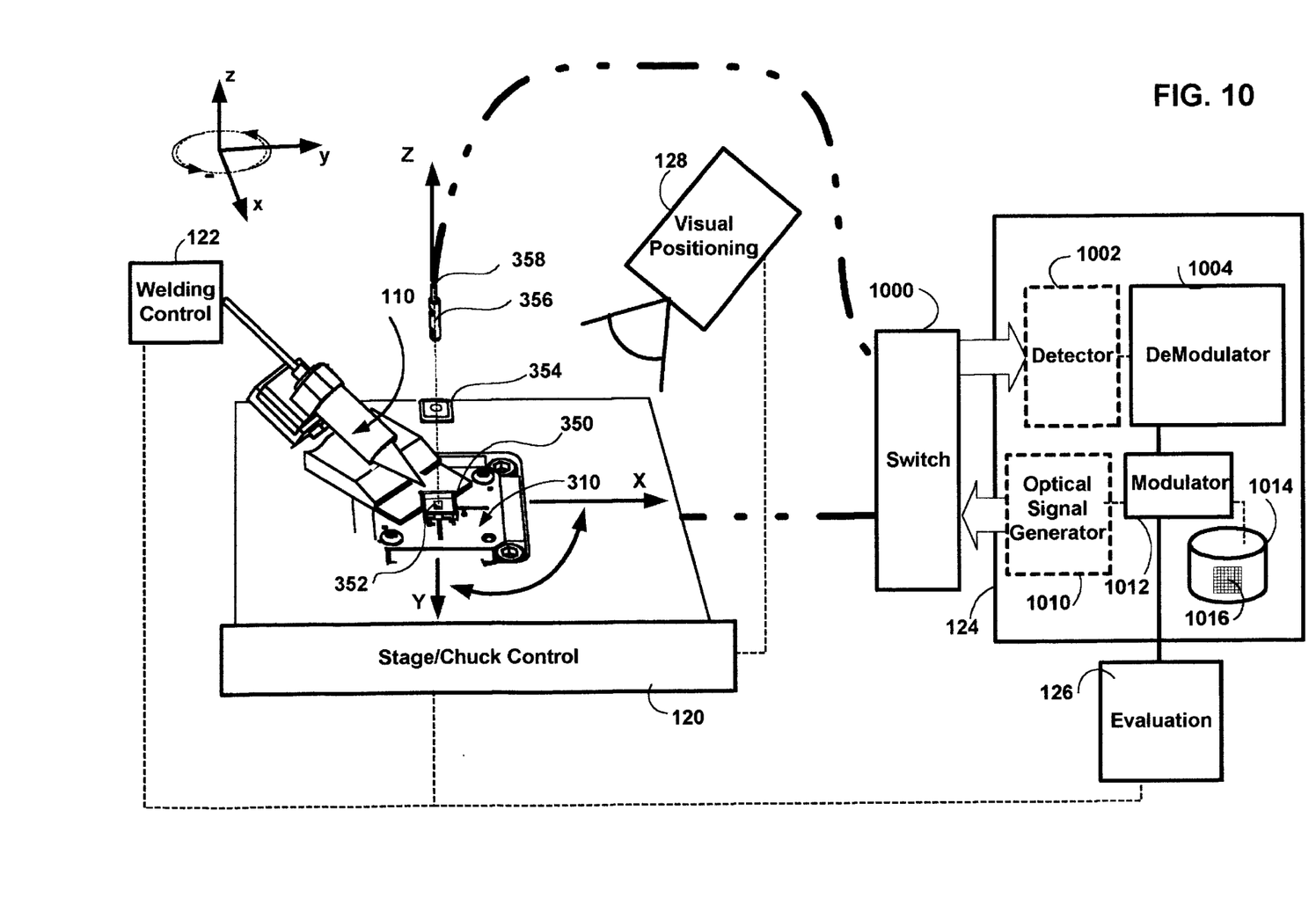
FIG. 10 is a hardware block diagram showing the automated closed loop alignment system for assembly of the OE device.

FIG. 10 is a hardware block diagram showing the automated closed loop alignment system for assembly of the OE device. Each of modules 120–128 is laid out graphically next to at least one of the corresponding parts of the AFPM or OE assembly with which they interface.

In an automated embodiment of the invention, the imaging device 150 is coupled to the visual positioning module 128 for the initial positioning of the fiber optic with respect to the OE device.

The stage/chuck control 120 is coupled to the actuators for each of the stages. That control handles the clamping of the package and lid to the translation stage. During the initial assembly stage, the stage/chuck control raises or lowers the chuck 140 (not shown) to move the fiber/ferrule combination along the z-axis. It also controls the motion of the welding heads, e.g., head 110. Additionally, it controls both x-y translation as well as rotation of the package and lid with respect to the fiber/ferrule, as well as the welding heads. That module also handles the clamping and unclamping of the chuck, and the clamping of the package and lid to the test bed 310.

The Modulation and Demodulation (Mo/Dem) module 124 is shown coupled via switch 1000 to both the test bed 310 and to the fiber optic 358. The Mo/Dem handles both the sending and receiving of information across the fiber optic and OE coupling. The Mo/Dem includes on the receive side: an optional photo-detector 1002 and a demodulator 1004. On the transmit side the Mo/Dem includes memory 1014, modulator 1012 and an optional signal generator 1010. Within memory 1014 is stored program code and signal sequences or information to be modulated across the OE device and fiber junction. Additionally, memory 1014 may be used to store evaluation data correlating a plurality of alignments/positions of the fiber 358 and OE device 352 with the fidelity of the information transmitted and received at each alignment/position.

Where the OE is a laser, the modulator is directly coupled by switch 1000 to the test bed and through it to the OE to modulate its signal output during alignment and welding of the fiber/ferrule to the lid 354 and package 350. The detector is operative on the receive side to convert the optical to an electrical signal and to pass it to the demodulator. Where the OE is a photo-detector, the modulator 1012 is coupled to the optical signal generator 1010 which is in turn coupled via switch 1000 to the fiber 358. The optical signal generator, e.g., a laser, converts the electrically modulated signal to an optically modulated signal and inserts it into the fiber 358. On the receive side the switch couples the demodulator 1004 to the test bed to receive the signals generated by the OE device 352. The detector is not operative in this instance since the OE device, a photo-detector, performs the conversion of optical to electrical signals. Where other OE devices, such as wave guides, circulators, etc. are involved, both the detector and optical signal generator may be required to send and receive optically encoded information across the fiber/OE device junction. Modulation may be analog or digital or combinations thereof.

The evaluation module 126 evaluates the fidelity of the information transmitted and received by the Mo/Dem 124 and determines at which orientations/alignments the optic fiber and OE device couple in such a way as to exhibit a local or global optimum in the fidelity of the modulated signals passed between them. When such an alignment is determined, the welding of the OE package, lid, and ferrule is initiated with the passing of orientation information from the evaluation module 126 to the stage/chuck control 120. The orientation information includes either absolute or relative position and/or orientation information for one or more of the package, lid, ferrule and fiber. The stage/chuck control then positions the package/lid and fiber accordingly to bring them into alignment. The stage or chuck control also controls any movement of the welding heads (e.g., head 110) during spotting or seaming of the joints between ferrule-lid and lid-package.

The welding control 122 is coupled to the welding heads 110–116 and handles the application of power to one or more of those heads to mechanically couple the fiber optic, lid and package of the OE assembly once they are properly aligned. Modules 120–128 may be implemented in hardware, software or firmware.

Figure 11:
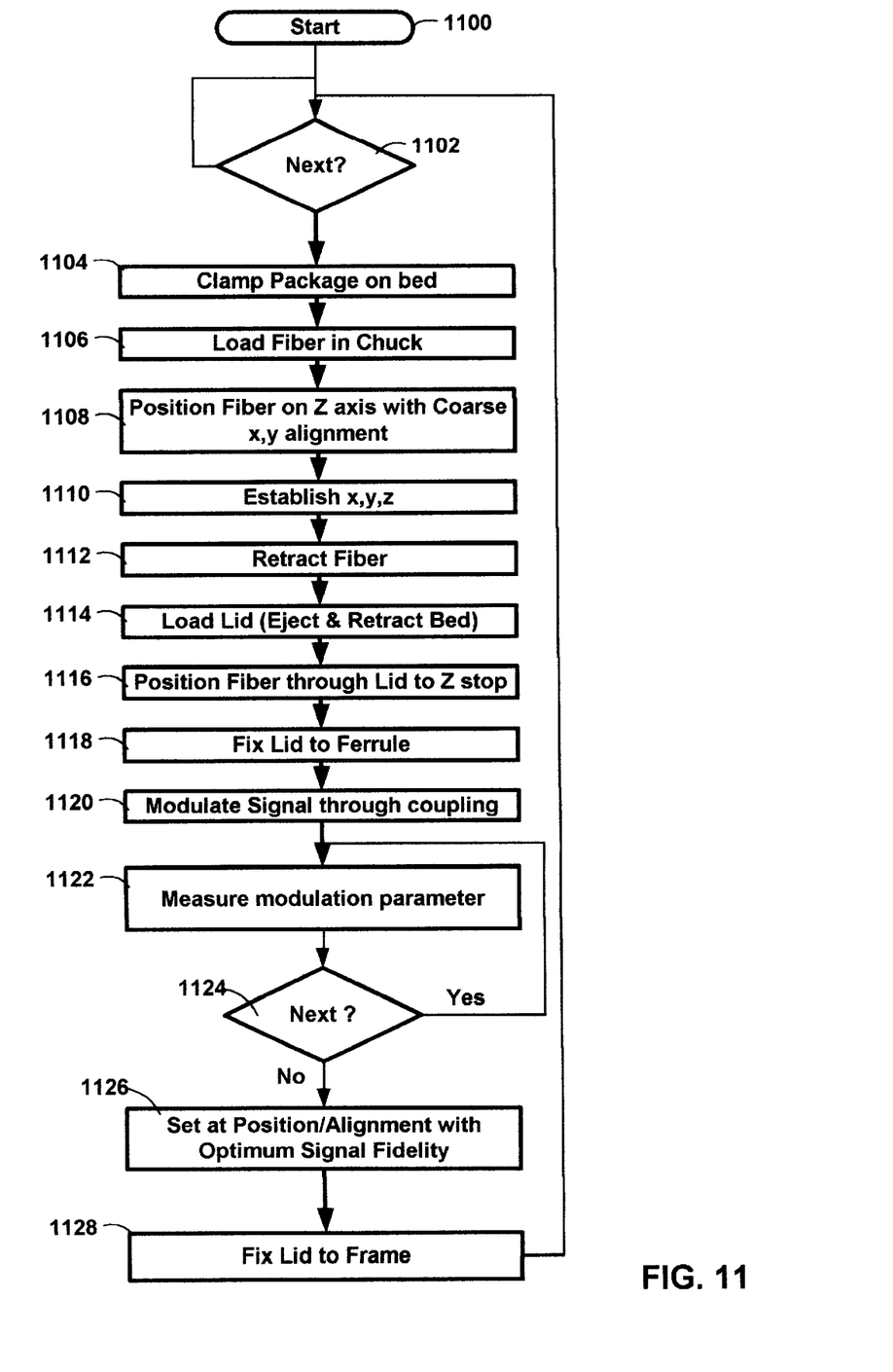
FIG. 11 is a process flow diagram detailing the various processes associated with the high frequency electrical coupling and mechanical assembly of the OE device and fiber pigtail.

FIG. 11 is a process flow diagram detailing the various processes associated with the coupling and mechanical assembly of the OE device and fiber pigtail. Processing begins at start block 1100 in which the system is initialized. Then control passes to decision block 1102. In decision block 1102 a determination is made that the next OE assembly will commence. Then control passes to process 1104. In process 1104 the package is loaded onto the test bed and clamped via arms 300,320 to the test bed. Then control passes to process 1106 in which the fiber and ferrule 358–356 (See FIG. 3) are placed within chuck 140. These placements may be accomplished manually or by means of parts placement devices well known to those skilled in the art. Control then passes to decision process 1108. In decision process 1108 the fiber 358 is moved downward along the z-axis until it has reached the proper alignment along an optical axis of the OE device 352 (See FIG. 3). This process may be accomplished using the imaging device 150. The visual positioning module 128 (See FIGS. 1, 10) accepts the images provided by the imaging device 150 and positions the fiber optic coarsely on the x-y axes and along the z-axis via commands sent by the staging and chuck control module 120 to which it is coupled. Then control passes to process 1110 in which the x-, y- and z-axes are stored. Next, control passes to process 1112. In process 1112 the fiber and ferrule is retracted to allow placement of the lid 354 on the rim of package 350. Then control is passed to process 1114 in which the lid is loaded. Next, control is passed to process 1116 in which the fiber and ferrule are moved by the z axis stage under control of the stage/chuck control module 120 (See FIGS. 1,10) to the z axis position stored above in process 1110. Next, in process 1118 the lid is spot welded to the ferrule. Then, in process 1118, the chuck is released and the rotary stage rotated, thereby allowing one or more of the weld heads to complete a seam weld joining the ferrule to the lid. Then control is passed to process 1120. In process 1120 a modulated signal is passed through the fiber/OE device coupling. The signal is generated by the Mo/Dem module 124. This signal is demodulated by the module. Then control is passed to process 1122. In process 1122, the fidelity of information transfer between the transmitted and received information is evaluated by assigning it a relative or absolute figure of merit, which is stored along with the alignment/position information of the coupling at the time of the evaluation. Then control is passed to decision process 1124 for a determination whether any further shifts in position/alignments need to be made. If there are, then control returns to process 1122. If all evaluation is complete, then control passes to process 1126. In process 1126, the stored parameters from process 1122 are sorted to find the alignment/position for the fiber and OE device at which signal fidelity is a maximum. These parameters are used to position the fiber and device. Then control is passed to process 1128. In process 1128 the lid is spot welded to the rim of the package 350. Then, in process 1128, all four sides of the lid/package joint are seam welded by movement of one or more of: the weld heads 110–116, the x-y stages 132–134, and the rotary stage 130.

In an alternate embodiment of the invention the lid includes a transparent portion, thereby avoiding the separate process 1114 of loading the lid. In this embodiment of the invention the z-axis positioning in process 1110 is performed with the lid in place.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for coupling an optical fiber with an optical device, and the apparatus comprising:

a modulator coupled to a one of the optical fiber and the optical device, and said modulator for transmitting a modulated signal including data;

a demodulator coupled to an other of the optical fiber and the optical device, and said demodulator for receiving the modulated signal and demodulating the data;

an evaluator coupled to said modulator and said demodulator, and said evaluator for evaluating the fidelity of the data received and the data transmitted at a plurality of positions of the optical fiber and the optical device and for selecting preferred positions for the optical fiber and the optical device based on the fidelity of the data transfer; and at least one movable stage responsive to a selection of the preferred positions by said evaluator to position at least one of the optical fiber and the optical device at the preferred positions.

2. The apparatus for coupling an optical fiber with an optical device of claim 1, further comprising:

at least one welder responsive to a positioning of the optical fiber and the optical device at the preferred positions to affix the optical fiber with the optical device.

3. The apparatus for coupling an optical fiber with an optical device of claim 2, wherein said at least one welder comprises: a first welder, a second welder, a third welder and at least a fourth welder, and each of said welders positioned radially about a junction between the optical fiber and the optical device.

4. The apparatus for coupling an optical fiber with an optical device of claim 1, wherein said at least one movable stage comprises:

an x-stage, a y-stage, and a z-stage, and said x-,y-,z-stages for positioning the optical fiber and the optical device with respect to one another.

5. The apparatus for coupling an optical fiber with an optical device of claim 1, wherein said at least one movable stage comprises:

an x-y stage for positioning a one of the optical fiber and the optical device; and a z-stage for positioning an other of the optical fiber and the optical device.

6. The apparatus for coupling an optical fiber with an optical device of claim 1, further comprising:

a memory for storing parameters correlating fidelity of transmitted and received data at each of a plurality of positions of the optical fiber and the optical device.

7. The apparatus for coupling an optical fiber with an optical device of claim 1, further comprising:

a test fixture coupled to the at least one movable stage, and the test fixture including an electrical interface for electrically coupling one of said modulator and said demodulator to said optical device.

8. An apparatus for coupling an optical fiber with a ferrule at an end thereof, with an optical device contained within an interior portion of a package, and the package including at an exterior portion thereof a first electrical interface to the optical device and the apparatus for coupling comprising:

an x-stage, a y-stage and a z-stage, and said stages coupled to at least one of the optical fiber with a ferrule and the package, and for positioning the optical fiber with respect to the optical device;

a test fixture with a second electrical interface for removably forming a high frequency electrical coupling with the first electrical interface to transmit and receive a high frequency signal from the optical device; and at least one welder responsive to a positioning of the optical fiber and the optical device at preferred positions to affix the optical fiber with the optical device.

9. The apparatus for coupling of claim 8, further comprising:

an evaluator coupled to both the optical fiber and the second electrical interface to evaluate the fidelity of data transferred between said optical fiber and said optical device at a plurality of positions of the optical fiber and the optical device and for selecting preferred positions of the optical fiber and the optical device, based on the fidelity of the data transfer between the optic fiber and the optical device.

10. The apparatus for coupling of claim 9, further comprising:

an imaging system coupled to said stages for performing an initial alignment of the optical fiber and the optical device.

11. The apparatus for coupling of claim 9, further comprising:

a modulator coupled to said evaluator and to a one of the optical fiber and the optical device, and said modulator for transmitting a modulated signal including the data; and a demodulator coupled to said evaluator and to an other of the optical fiber and the optical device, and said demodulator for receiving the modulated signal and demodulating the data.

12. The apparatus for coupling of claim 8, wherein said at least one welder comprises: a first welder, a second welder, a third welder and at least a fourth welder, and each of said welders positioned radially about the package.

13. The apparatus for coupling of claim 8, wherein the second electrical interface of said test fixture further comprises:

a printed circuit board with an upper surface patterned with an electrically conductive layer to electrically contact said first electrical interface of the package and a lower surface of the printed circuit board patterned with an electrically conductive layer acting as a ground plane to limit the impedance resulting from the delivery of high frequency signals over the first and second electrical interfaces.

14. The apparatus for coupling of claim 13, wherein the impedance of the second electrical interface is approximately 50 ohms.

15. A method for coupling an optical fiber to an optical device, and the method for coupling comprising the acts of:

modulating and demodulating data across the junction between the fiber optic and the optoelectronic device;

correlating the fidelity of the data received and the data transmitted at a plurality of positions of the optical fiber and the optical device; and selecting a preferred position based on the fidelity of the data transfer as determined in said act of correlating.

16. The method for assembling an optic fiber to an optoelectronic device within an interior portion of a package, and the method for assembling comprising the acts of:

evaluating a fidelity of data transfer across the junction of the fiber and optoelectronic device at a plurality of positions of the optical fiber and the optical device to determine a preferred position for the fiber and the optoelectronic device; with the evaluating act including:

determining for the fiber optic a preferred position along a z-axis substantially parallel with an optical axis of the optoelectronic device;

clamping a lid over the interior portion of the package;

inserting the fiber optic through an opening defined in the lid to the preferred position along the z-axis;

modulating and demodulating data across the junction between the fiber optic and the optoelectronic device;

correlating the fidelity of the data received and the data transmitted at a plurality of positions of the optical fiber and the optoelectronic device; and selecting a preferred position based on the fidelity of the data transfer as determined in said act of correlating; and fastening the fiber to the package at the preferred position.

17. An apparatus for coupling an optical fiber with an optical device, and the apparatus comprising:

means for modulating data onto a one of the optical fiber and the optical device;

means for demodulating the data at an other of the optical fiber and the optical device;

means for evaluating a fidelity between modulated and demodulated data at a plurality of positions of the optical fiber and the optical device and for selecting preferred positions for the optical fiber and the optical device based on the fidelity; and means for positioning at least one of the optical fiber and the optical device at the preferred positions responsive to a selection of the preferred positions by said means for evaluating.

18. An apparatus for coupling an optical fiber with a ferrule at an end thereof, with an optical device contained within an interior portion of a package, and the package including at an exterior portion thereof a first electrical interface to the optical device, and the apparatus for coupling comprising:

means for removably forming a high frequency electrical coupling with the first electrical interface to transmit and receive a high frequency signal from the optical device;

means for positioning the optical fiber and the optical device at preferred positions; and means for fastening the optical fiber with the optical device.

* * * * *

UNITED STATES PATENT AND TRADEMARK OFFICE
CERTIFICATE OF CORRECTION

PATENT NO. : 6,325,551 B1
DATED : December 4, 2001
INVENTOR(S) : Robert S. Williamson, III and Robert Marsland It is certified that error appears in the above-identified patent and that said Letters Patent is hereby corrected as shown below:

Column 14,
Line 1, please change "electricalinterface" to -- electrical interface --.

Signed and Sealed this

Fourth Day of June, 2002

Attest:

Attesting Officer

JAMES E. ROGAN
*Director of the United States Patent and Trademark Office*